(12) United States Patent
Longo

(10) Patent No.: US 7,678,306 B2
(45) Date of Patent: Mar. 16, 2010

(54) VIBRATION APPARATUS AND METHODS OF VIBRATION

(75) Inventor: Curtis Longo, Alta Loma, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 329 days.

(21) Appl. No.: 11/783,239

(22) Filed: Apr. 6, 2007

(65) Prior Publication Data

US 2007/0182050 A1 Aug. 9, 2007

Related U.S. Application Data

(62) Division of application No. 10/623,551, filed on Jul. 22, 2003, now Pat. No. 7,217,380.

(60) Provisional application No. 60/397,022, filed on Jul. 22, 2002.

(51) Int. Cl.
*B29C 43/22* (2006.01)

(52) U.S. Cl. .............................. 264/71; 141/10; 141/12; 366/115; 366/127; 366/275; 264/443; 264/313; 264/317; 249/179

(58) Field of Classification Search .................. 264/71, 264/317; 249/179; 366/127, 275
See application file for complete search history.

(56) References Cited

U.S. PATENT DOCUMENTS

| | | | |
|---|---|---|---|
| 1,945,015 A | 1/1934 | Wurzbach et al. | |
| 2,517,902 A | * 8/1950 | Luebkeman | ................. 264/221 |
| 2,762,419 A | 9/1956 | Prewitt | |
| 3,466,017 A | 9/1969 | Malvin | |
| 4,783,232 A | 11/1988 | Carbone et al. | |
| 4,821,245 A | 4/1989 | Riedlinger | |
| 4,822,444 A | 4/1989 | Weingart et al. | |
| 4,869,761 A | 9/1989 | Weingart et al. | |
| 4,907,754 A | 3/1990 | Vaniglia | |
| 4,938,824 A | 7/1990 | Youngkeit | |
| 5,022,952 A | 6/1991 | Vaniglia | |
| 5,059,377 A | 10/1991 | Ashton et al. | |

(Continued)

FOREIGN PATENT DOCUMENTS

EP 0 770 472 A1 5/1997

(Continued)

OTHER PUBLICATIONS

John Berry, International Search Report for International Application No. PCT/US01/43091 (Jul. 17, 2002).

(Continued)

*Primary Examiner*—Christina Johnson
*Assistant Examiner*—Magali P Théodore
(74) *Attorney, Agent, or Firm*—Finnegan Henderson Farabow Garrett & Dunner, L.L.P.

(57) ABSTRACT

The present invention relates to apparatus and methods of vibration. In particular, the present invention relates to apparatus and methods of vibration for tooling in a structure, such as, for example, a fuselage. In one implementation, the tooling comprises at least two conductors that create a force to vibrate the media in the tooling, which improves the compaction of the media in the tooling and the extraction of the media from the tooling. Other implementations may be used for compaction and/or extraction of the media in the tooling.

3 Claims, 14 Drawing Sheets

U.S. PATENT DOCUMENTS

| | | |
|---|---|---|
| 5,126,979 A | 6/1992 | Rowe et al. |
| 5,223,067 A | 6/1993 | Hamamoto et al. |
| 5,242,523 A | 9/1993 | Willden et al. |
| 5,259,901 A | 11/1993 | Davis et al. |
| 5,262,121 A * | 11/1993 | Goodno ............... 264/571 |
| 5,266,137 A | 11/1993 | Hollingsworth |
| 5,271,439 A | 12/1993 | Alack |
| 5,362,345 A | 11/1994 | Stettler et al. |
| 5,378,109 A | 1/1995 | Lallo et al. |
| 5,447,765 A | 9/1995 | Crane |
| 5,571,357 A | 11/1996 | Darrieux et al. |
| 5,925,297 A | 7/1999 | Noto |
| 5,932,256 A | 8/1999 | Mandish |
| 6,086,524 A | 7/2000 | Martin |
| 6,096,164 A | 8/2000 | Benson et al. |
| 6,172,344 B1 | 1/2001 | Gordon et al. |
| 6,179,945 B1 | 1/2001 | Greenwood et al. |
| 6,190,598 B1 | 2/2001 | Murphy et al. |
| 6,823,578 B2 | 11/2004 | Anderson et al. |
| 6,939,032 B2 | 9/2005 | Cosby et al. |
| 7,059,034 B2 | 6/2006 | Anderson et al. |
| 7,101,452 B2 | 9/2006 | Teufel et al. |
| 7,101,453 B2 | 9/2006 | Teufel et al. |
| 7,124,797 B2 | 10/2006 | Anderson et al. |
| 7,226,559 B2 | 6/2007 | Maxwell et al. |
| 2004/0103918 A1 | 6/2004 | Teufel et al. |

FOREIGN PATENT DOCUMENTS

| | | |
|---|---|---|
| EP | 0 786 330 A2 | 7/1997 |
| EP | 1 005 978 A2 | 6/2000 |
| FR | 2 424 470 | 11/1979 |
| FR | 2 664 529 | 1/1992 |
| GB | 1 481 167 | 7/1977 |
| GB | 2 232 954 A | 1/1991 |
| JP | 0 4179515 | 6/1992 |
| WO | WO 98/32589 | 7/1998 |

OTHER PUBLICATIONS

J. Carre, International Search Report for International Application No. PCT/US02/05094 (Aug. 2, 2002).

D.V. Rosato et al., "Filament Winding: Its Development, Manufacture, Applications, and Design," John Wiley & Sons, Inc., (1964).

A. Van Wallene, International Search Report for International Application No. PCT/US01/45750 (Sep. 19, 2002).

McMaster-Carr Supply Company Catalog 105, p. 1581 (1999).

Office Action Dated Apr. 27, 2009 in U.S. Appl. No. 11/783,162.

Notice of Allowance Dated Sep. 28, 2009 in U.S. Appl. No. 11/783,162.

* cited by examiner

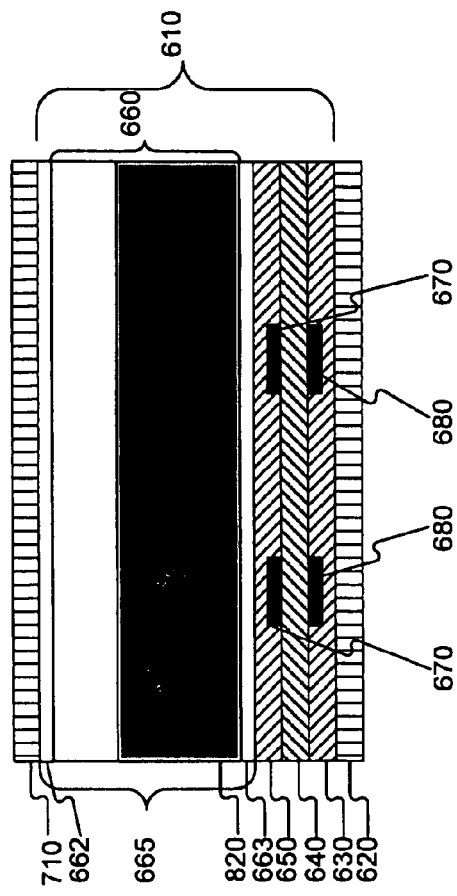
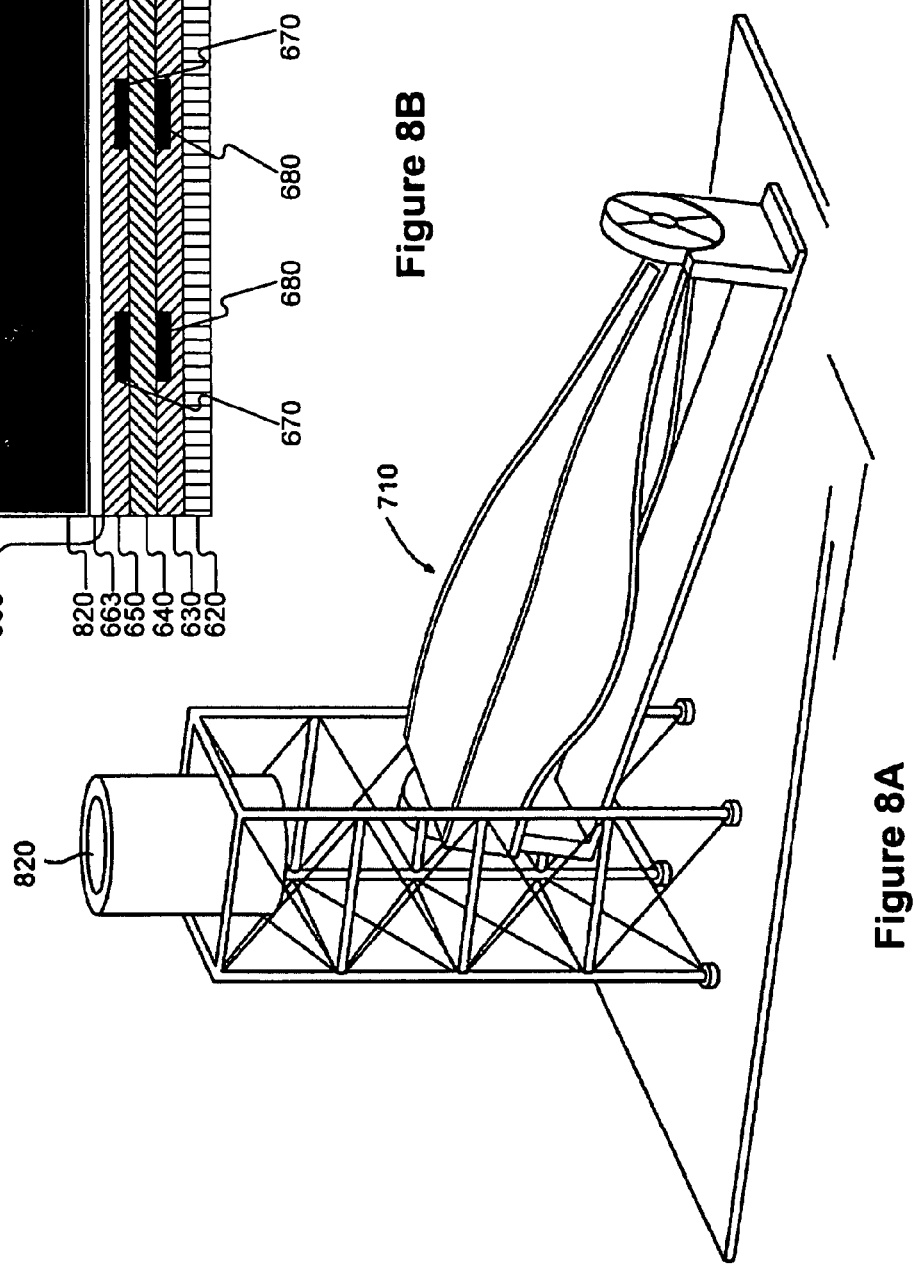
Figure 8B
Figure 8A

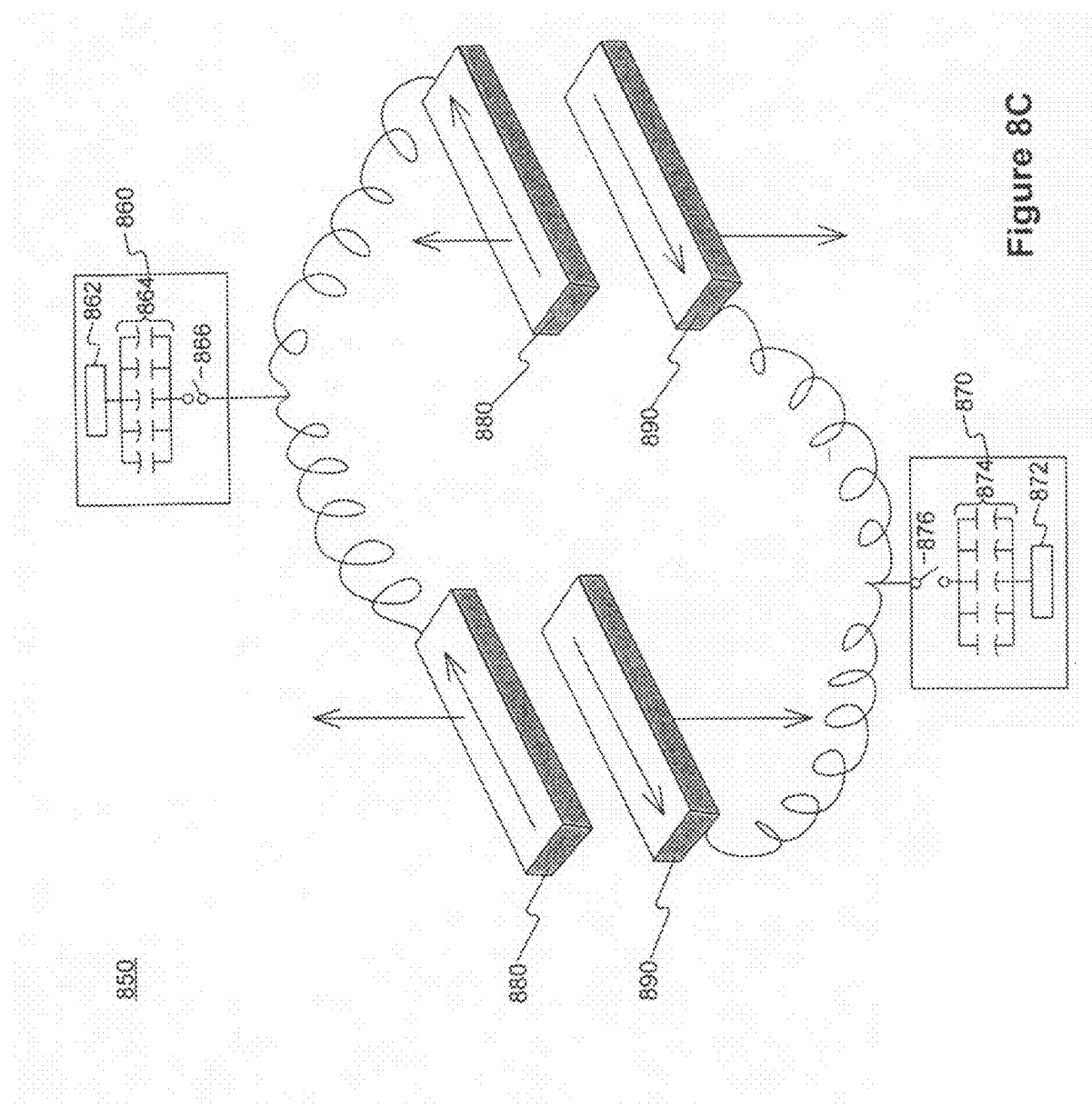

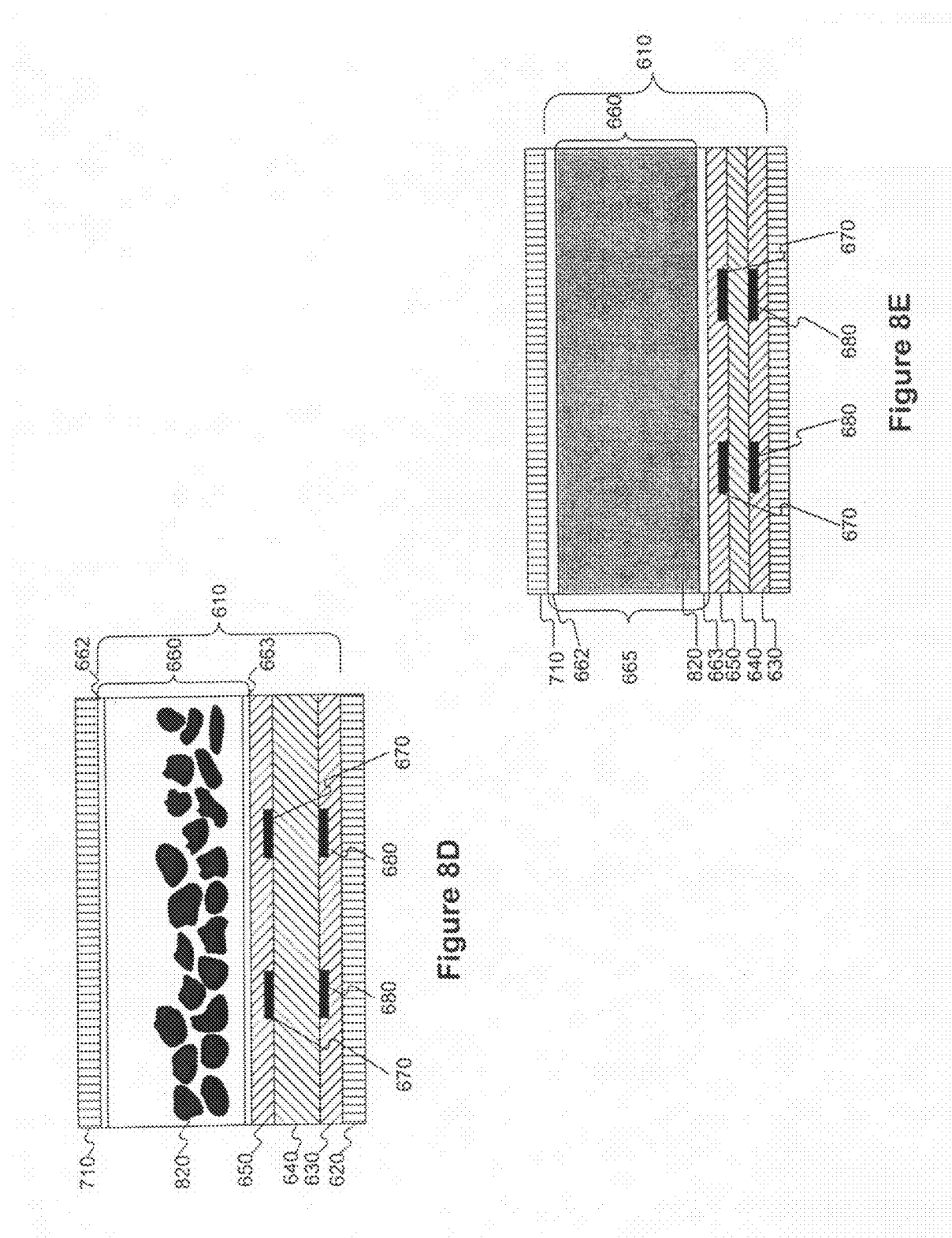

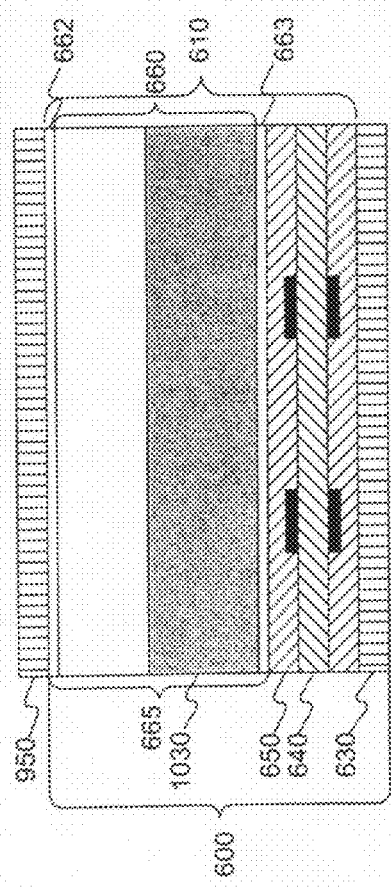
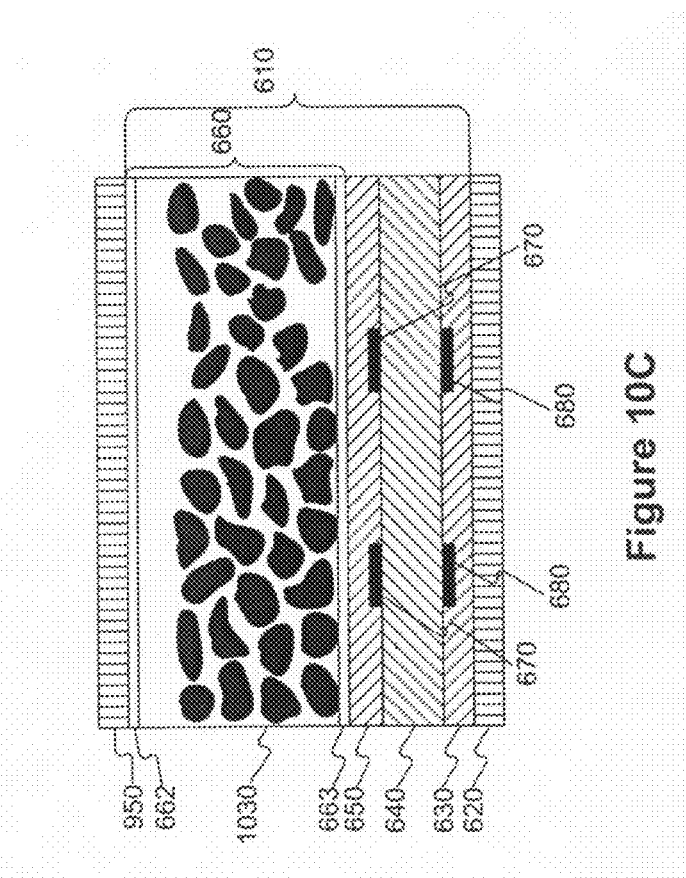
Figure 10B
Figure 10C

VIBRATION APPARATUS AND METHODS OF VIBRATION

I. CROSS-REFERENCE TO RELATED APPLICATION

This is a divisional application of application Ser. No. 10/623,551, filed Jul. 22, 2003 by Curtis Longo and titled VIBRATION APPARATUS AND METHODS OF VIBRATION, now U.S. Pat. No. 7,217,380, which claims the benefit of U.S. Provisional Application No. 60/397,022, filed Jul. 22, 2002, by Curtis Longo and titled VIBRATION APPARATUS AND METHODS OF VIBRATION, for which benefit of priority is claimed herein, and both of which are expressly incorporated herein by reference.

II. BACKGROUND

A. Technical Field

The present invention relates to apparatus and methods of vibration. In particular, the present invention relates to apparatus and methods of vibration within tooling for a fuselage.

B. Technology Background

Presently, composite materials (such as fiber-reinforced plastics) are increasingly being used to manufacture aircraft. The manufacture of such aircraft with composite materials comprises the manufacture of the fuselage (the central body of the aircraft), the wings, and the various other components of the aircraft. Often the manufacture of an aircraft fuselage with composite materials comprises the use of tooling to form the shape of the fuselage. For example, in some manufacturing processes, laminate fibers are wrapped around a tooling to form the fuselage.

In some cases, internal tooling is constructed of elastomeric materials. The use of elastomeric materials provides for increased flexibility in the formation of the shape of the tooling. However, elastomeric tooling may not provide the rigidity needed during the formation of the tooling. Therefore, to solve this problem, the elastomeric tooling may be filled with a filler media, such as ceramic spheres available under the product name Macrolite, which is then held under vacuum to provide the necessary rigidity. After curing, the media is removed from the tooling.

Currently, tooling can be filled with media by using gravity. In order to compact the media, either a rubber mallet or a single-point-high-frequency vibrator may be used on the exterior of the tooling. Following formation of a structure with the tooling, a vacuum device may be used to extract the media from the tooling. However, the compaction of the media often prevents the vacuum from extracting all of the media. Therefore, the rubber mallet or the single-point-high-frequency vibrator may be used to dislodge the media to enable extraction.

The use of these methodologies, however, has proven to be inefficient in filling the tooling with media, compacting the media in the tooling, and extracting the media from the tooling. By generally acting only on a portion of the tooling, these methods affect only a small, localized area of the tooling. Thus, these methodologies must be repeated numerous times to achieve the desired result. This repetition increases the time to produce the structure as well as the labor costs.

Thus, there is a need for an apparatus that can act on more than only a localized area of the tooling. Such an apparatus would be more efficient and would also provide for smaller particle sizes of the media, leading to improved filling and extraction of the media.

Apparatus and methods consistent with the invention provide for a vibration apparatus that acts on a larger area of the tooling to affect a large portion of the media in the tooling to aid in filling the tooling with media, compacting the media in the tooling, and extracting the media from the tooling.

III. SUMMARY OF THE INVENTION

An apparatus consistent with the present invention provides a vibration apparatus for tooling. The vibration apparatus includes a container comprising a top surface, a bottom surface, a first layer of elastomeric material located on the bottom surface, a first conductor located in the first layer, a second layer of elastomeric material on the first layer, and defining a space between the first layer and the second layer, a second conductor located in the second layer in proximity to the first conductor; and a cavity located between the top surface and the second layer.

A method consistent with the present invention provides a method of vibrating tooling. The method includes generating a first current flow in a first conductor located in the tooling; and producing a vibration in the tooling by generating a second current flow opposite the first current flow in a second conductor located in the tooling and being in proximity to the first conductor.

Another method consistent with the present invention provides a method of filling a tooling with media. The method includes placing, media in the tooling and vibrating the tooling to compact the media in the tooling. Vibrating further comprises generating a first current flow in a first conductor located in the tooling and producing a vibration in the tooling by generating a second current flow opposite the first current flow in a second conductor located in the tooling and being in proximity to the first conductor.

Another method consistent with the present invention provides a method of extracting media from a tooling. The method includes inserting a vacuum into the tooling; removing media from the tooling using the vacuum; and vibrating the tooling during removing media to dislodge the media in the tooling. Vibrating further includes generating a first current flow in a first conductor located in the tooling and producing a vibration in the tooling by generating a second current flow opposite the first current flow in a second conductor located in the tooling and being in proximity to the first conductor.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments of the invention and, together with the following description, serve to explain the principles of the invention.

In the drawings:

FIG. 8A illustrates introducing media into a mandrel consistent with an embodiment of the present invention, as shown in FIG. 7;

FIG. 8B is a cut-away view of introducing media into a mandrel consistent with an embodiment of the present invention, as shown in FIG. 8A;

FIG. 8C is an illustrative view of a conductor assembly consistent with an embodiment of the present invention, as shown in FIG. 8B;

FIG. 8D is a cut-away view of a portion of a mandrel depicting compacting of media consistent with an embodiment of the present invention, as shown in FIG. 8C;

FIG. 8E is a cut-away view of a mandrel filled with media consistent with an embodiment of the present invention, as shown in FIG. 8D;

FIG. 10B is a cut-away view of compacted media removal in a mandrel consistent with an embodiment of the present invention, as shown in FIG. 10A;

FIG. 10C is a cut-away view of a portion of a mandrel depicting extraction of media consistent with an embodiment of the present invention, as shown in FIG. 10B.

V. DESCRIPTION OF THE EMBODIMENTS

A. Introduction

Apparatus and methods consistent with the present invention are described herein with respect to a vibration apparatus. The following embodiments describe implementations based on the use of tooling to form a shape for a structure, such as, for example, fuselage. However, other implementations may be used according to the invention with other tooling for other shapes and structures. The following examples are just some of the embodiments and implementations consistent with the invention. Other embodiments and other implementations may also be used.

B. Apparatus and Methods

Figure 1:
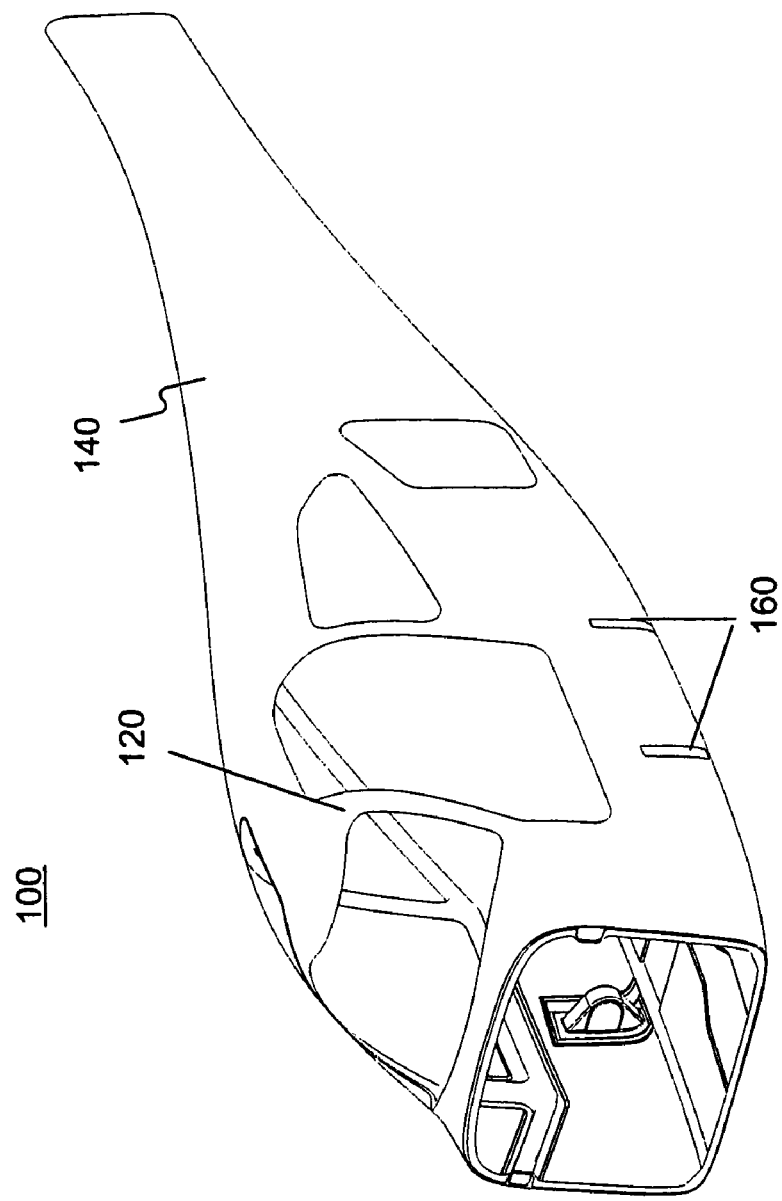
FIG. 1 is a perspective view of a fuselage for an aircraft.

FIG. 1 is a perspective view of a fuselage for an aircraft. As shown in FIG. 1, a fuselage 100 comprises an exterior surface 140, frame sections 120, and attachment pockets 160 for wings. Fuselage 100 may also comprise other frame sections, attachments pockets, and flanges (not shown). Fuselage 100 may also comprise other components and subcomponents (not shown).

Figure 2:
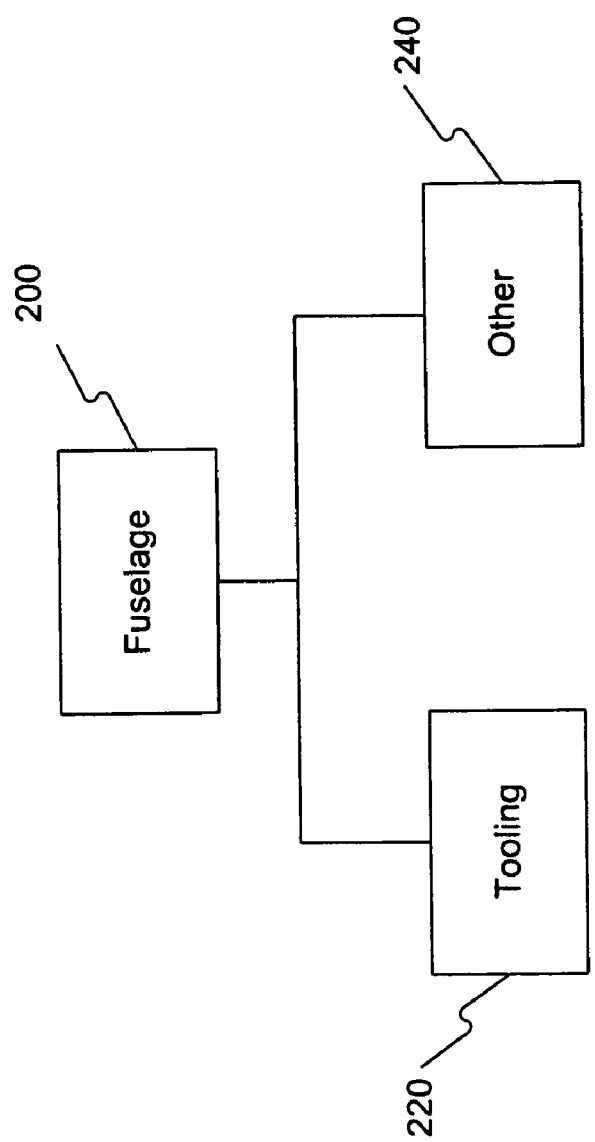
FIG. 2 is a block diagram illustrating components for manufacturing a fuselage consistent with an embodiment of the present invention.

FIG. 2 is a block diagram illustrating components for manufacturing a fuselage consistent with an embodiment of the present invention. As shown in FIG. 2, in one implementation, the components for manufacturing a fuselage 200 may comprise tooling 220 and other 240. Tooling 220 comprises any appropriate type of tooling needed for manufacturing a fuselage. For example, tooling 220 may comprise metal molds, molds made from composite materials, and/or mandrels made from metals and/or composite materials. Tooling 220 also comprises toolings made from elastomeric materials such as silicone, urethane, or natural rubbers. Tooling 220 further comprises such things as plastic or metal dies and punches. Tooling 220 may also comprise any other appropriate device or material for forming a shape for a structure. Other 240 may comprise molding, integration of tooling and molding, filament winding, or any other appropriate device or material for forming a shape for a structure. This implementation is merely exemplary, and other implementations may also be used.

Figure 3:
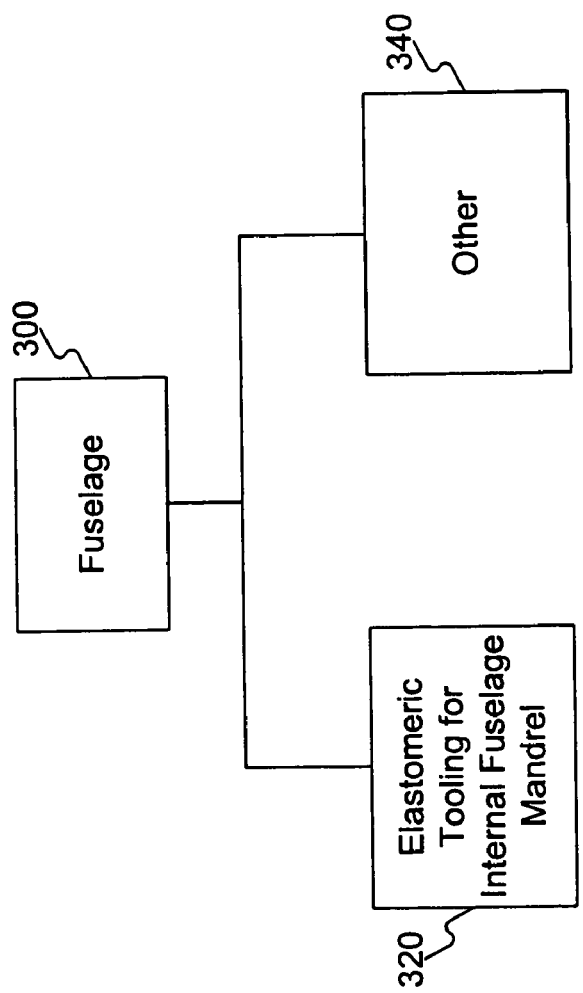
FIG. 3 is a block diagram illustrating the components for manufacturing a fuselage consistent with an embodiment of the present invention.

FIG. 3 is a block diagram illustrating the components for manufacturing a fuselage consistent with an embodiment of the present invention. As shown in FIG. 3, in one implementation, a fuselage 300 comprises elastomeric tooling for internal fuselage mandrel 320 and other 340. In this implementation, elastomeric tooling for internal fuselage mandrel 320 refers to a mandrel filled with filler media that is used to establish the shape of a fuselage. In other implementations, elastomeric tooling (not shown) may be used for other structures. In one implementation, other 340 may comprise molding, integration of tooling and molding, and filament winding to establish the shape of a fuselage. This implementation is merely exemplary, and other implementations may also be used.

Figure 4:
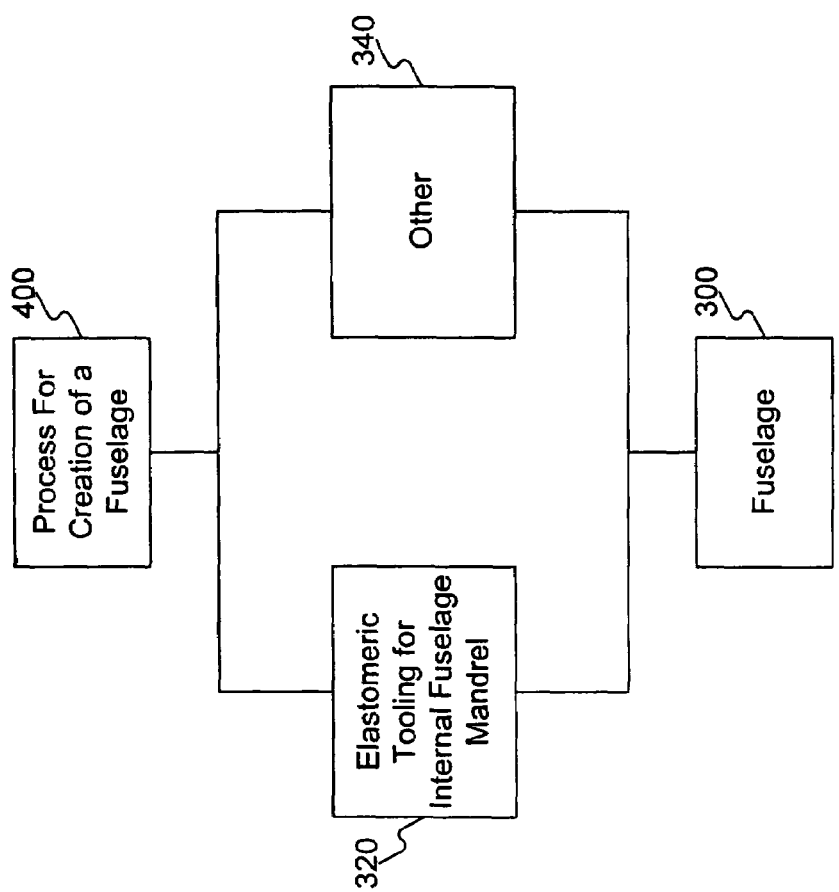
FIG. 4 is a flow diagram illustrating a process for creating a fuselage consistent with an embodiment of the invention.

FIG. 4 is a flow diagram illustrating a process for creating a fuselage consistent with an embodiment of the invention. As shown in FIG. 4, in one implementation, process for creation of a fuselage 400 comprises elastomeric tooling for internal fuselage mandrel 320 and other 340. As shown in FIG. 4, in this implementation, the process for the creation of a fuselage 400 comprises the combination of elastomeric tooling for internal fuselage mandrel 320 and other 340, which results in fuselage 300. This implementation is merely exemplary, and other implementations may also be used.

Figure 5:
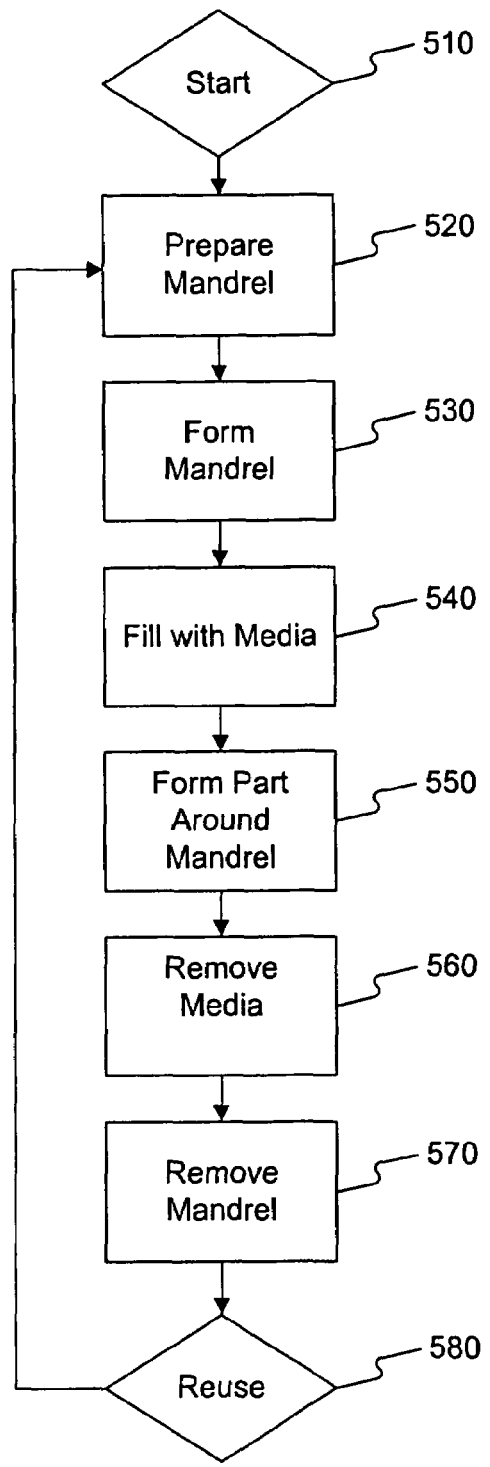
FIG. 5 is a flow diagram illustrating a process for creating a fuselage using a mandrel consistent with one embodiment of the present invention, as shown in FIG. 4.

FIG. 5 is a flow diagram illustrating a process for creating a fuselage using a mandrel consistent with one embodiment of the present invention, as shown in FIG. 4. As shown in FIG. 5, in one implementation, process 500 for creating a fuselage using a mandrel comprises start 510, prepare mandrel 520, form mandrel 530, fill with media, 540, form part around mandrel 550, remove media 560, remove mandrel 570, and reuse 580.

In this implementation, process 500 begins with start 510. After start 510 is prepare mandrel 520. In this implementation, prepare mandrel 520 comprises the selection of the size, shape, and type of mandrel to form the fuselage (such as fuselage 300). Prepare mandrel 520 is further described in FIGS. 6A-6B.

In this implementation, prepare mandrel 520 is followed by form mandrel 530. Form mandrel 530 comprises the forming of the mandrel to the desired shape of the fuselage. Form mandrel 530 is further described in FIG. 7.

In this implementation, form mandrel 530 is followed by fill with media 540. Fill with media 540 comprises filling the mandrel with filler media, such as ceramic spheres available under the product name Macrolite. Fill with media 540 may also comprise compacting the media. Fill with media 540 is further described in FIGS. 8A-8E.

In this implementation, fill with media 540 is followed by form part around mandrel 550. Form part around mandrel 550 comprises the formation of the fuselage by any appropriate process using a mandrel. This may comprise the winding of filament around the mandrel. Form part around mandrel 550 is further illustrated in FIG. 9.

In this implementation, form part around mandrel 550 is followed by remove media 560. Remove media 560 comprises the extraction of the media from the mandrel. Remove media 560 may also comprise dislodging any compacted media. Remove media 560 is further described in FIGS. 10A-10C.

In this implementation, remove media 560 is followed by remove mandrel 570. Removal mandrel 570 comprises the removal of the mandrel from the fuselage. Remove mandrel 570 is further described in FIG. 11.

In this implementation, remove mandrel 570 is followed by reuse 580. As shown in FIG. 5, after remove mandrel 570, reuse 580 indicates that the mandrel may be reused again.

The stages in FIG. 5 are merely exemplary, and other stages and other implementations may also be used.

Figures 6A, 6B:
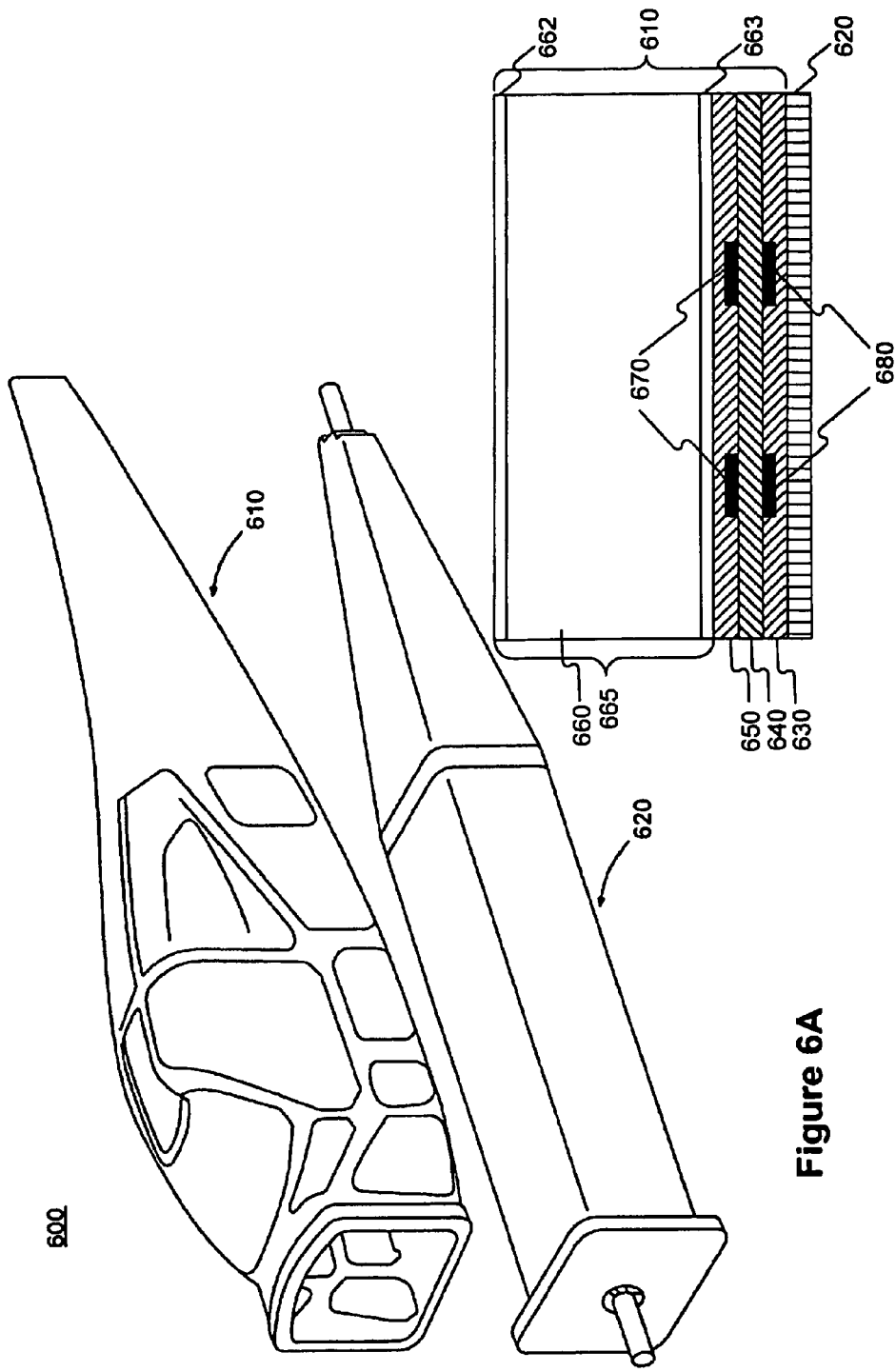
FIG. 6A illustrates mandrel preparation consistent with an embodiment of the present invention, as shown in FIG. 5.
FIG. 6B is a cut-away view of a portion of a mandrel consistent with an embodiment of the present invention, as described in FIG. 6A.

FIG. 6A illustrates mandrel preparation consistent with an embodiment of the present invention, as shown in FIG. 5. FIG. 6A shows the preparation of a mandrel 600, such as, for example, a reusable elastomeric mandrel currently available through International Design Technologies, Inc (IDT). This one type of mandrel is merely exemplary, and other mandrels may also be used. In one implementation, a bag 610 is placed around an armature 620 to form mandrel 600. This implementation is merely exemplary, and other implementations may also be used.

Bag 610 may comprise premolded silicone or any other appropriate form or substance. Some silicone materials that have been found acceptable comprise those available from Mosite and Kirkhill. In addition, there are many other suppliers of high temperature (up to 400° F.), unfilled, and uncured silicone sheet materials that may be used, depending upon the cure temperature of the desired part. In one implementation, a material, such as Depco 63 available from D Aircraft Products, can be sprayed to make an elastomeric mandrel. These implementations are merely exemplary, and other parts may also be used.

Armature 620 may be made of any appropriate material. In one implementation, a metal welded armature is used. However, other materials may also be used to form armature 620. In one implementation, to minimize weight and bending, armature 620 may be as large as possible, while allowing it to be removed from, bag 610. This implementation is merely exemplary, and other implementations may also be used.

FIG. 6B is a cut-away view of a portion of a mandrel consistent with an embodiment of the present invention, as described in FIG. 6A. As shown in FIG. 6B, bag 610 is on the outside of armature 620. As further shown in FIG. 6B, in one implementation, bag 610 comprises a first conductor layer 630, a spacing layer 640, a second conductor layer 650, a cavity 665, and a media cavity 660. Media cavity 660 is defined by the area between the top of bag 610 (designated as top of media cavity 662) and top of second conductor layer 650 (designated as bottom of media cavity 663). Cavity 665 is thus defined by top of media cavity 662 and bottom of media cavity 663.

In one implementation, to form cavity 665, bag 610 is sealed at each end of armature 620. First conductor layer 630, spacing layer 640, and second conductor layer 650 are bonded together inside of bag 610. Media cavity 660 is thus created inside bag 610.

As shown in FIG. 6B, first conductor layer 630 is located immediately on top of armature 620. In this implementation, first conductor layer 630 is a layer of elastomeric material embedded with two electrical conductors 680. Only two conductors 680 are depicted for ease of illustration, but any appropriate number of conductors may be used. In this implementation, conductors 680 may be composed of copper ribbon, however, any appropriate type of electrically conductive material may be used.

As also shown in FIG. 6B, second conductor layer 650 is located on top of spacing layer 640, which is located on top of first conductor layer 630. In this implementation, spacing layer 640 is formed by bonding second conductor layer 650 to first conductor layer 630 at interspersed spacing. In addition, in this implementation, second conductor layer is a layer of elastomeric material embedded with two electrical conductors 670. Only two conductors 670 are depicted for ease of illustration, but any appropriate number of conductors may be used. In this implementation, conductors 670 may be composed of copper ribbon, however, any appropriate type of electrically conductive material may be used.

As further shown in FIG. 6B, in this implementation, spacing layer 640 is located between first conductor layer 630 and second conductor layer 650. If an electrical charge is placed on first conductor layer 630 and second conductor layer 650 (as described in more detail below), spacing layer 640 provides an area for layers 630, 650 to flex apart, as further described in FIGS. 8A-8E.

As still further shown in FIG. 6B, in this implementation, media cavity 660 is between top of media cavity 662 and bottom of media cavity 663. If a charge is placed on first conductor layer 630 and second conductor layer 650 as described above, media cavity 600 also provides an area that may be flexed apart, as electrical currents are passed through conductors 670 and 680, as further described in FIGS. 8A-8E.

The implementation described above with reference to FIG. 6B is exemplary, and other implementations may also be used.

Figure 7:
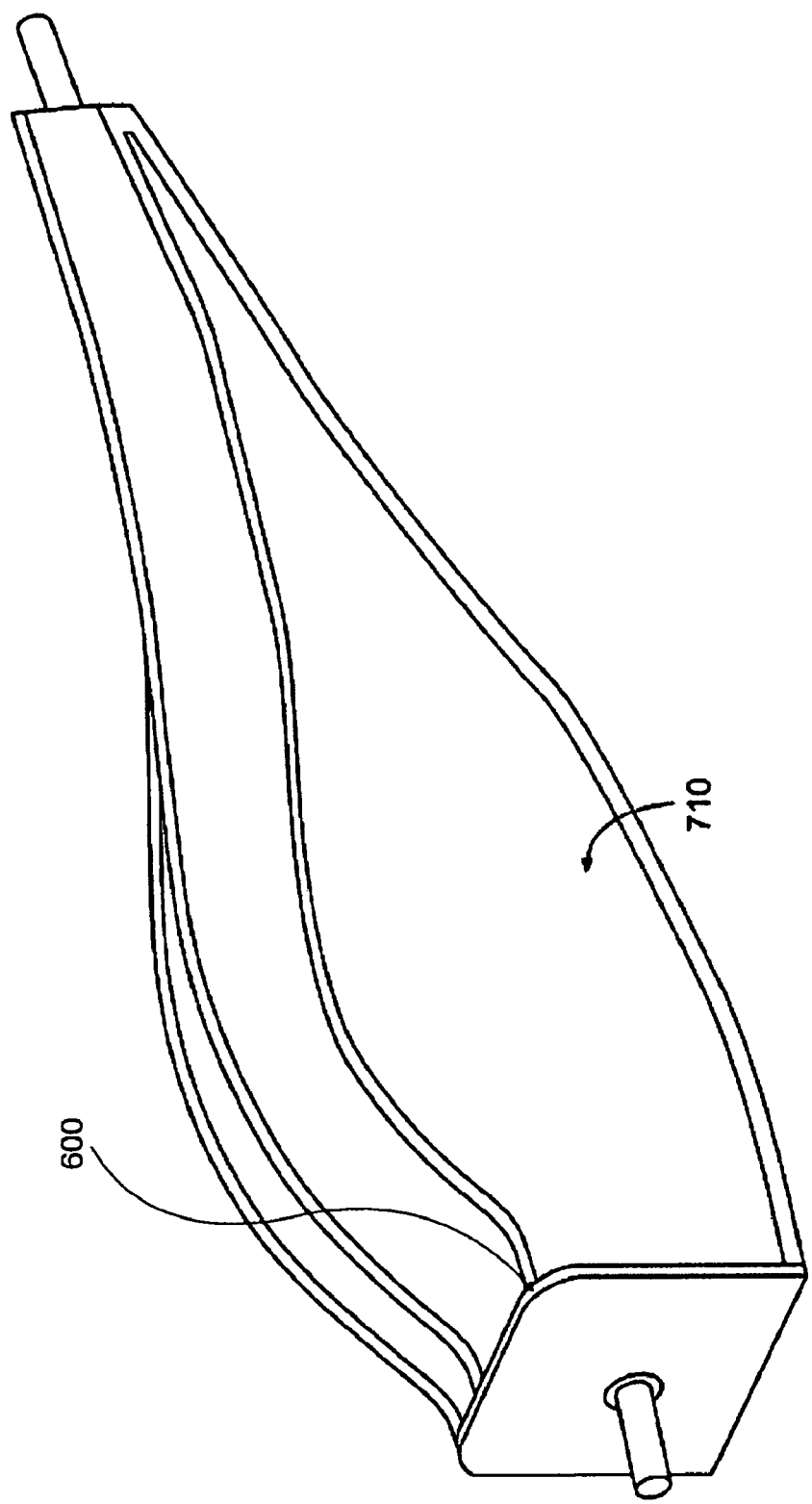
FIG. 7 is a perspective view of a mandrel in a form tool consistent with an embodiment of the present invention, as shown in FIG. 6A.

FIG. 7 is a perspective view of a mandrel in a form tool consistent with an embodiment of the present invention, as shown in FIG. 6A. As shown in FIG. 7, following placement of armature 620 in bag 610 to form mandrel 600 (as described in FIG. 6A), mandrel 600 is placed in a form tool 710. Form tool 710 may be used to form mandrel 600 to the desired shape for a fuselage. In one implementation, form tool 710 covers most of mandrel 600. In this implementation, form tool 710 is also sealed. In one implementation, this seal is accomplished by forming a vacuum. In another implementation, cavity 660 (not shown, but described in FIG. 6B) is filled with air to force bag 620 out to conform to the shape of form tool 710. These implementations are merely exemplary, and other materials and implementations may also be used.

FIG. 8A illustrates introducing media into a mandrel consistent with an embodiment of the present invention, as shown in FIG. 7. As shown in FIG. 8A, media 820 may be placed inside form tool 710, which contains mandrel 600 (as described above). As shown in FIG. 8A, in one implementation, the introduction of media 820 is performed in a semi-horizontal orientation. However, in other implementations, other orientations, such as a vertical orientation or any other appropriate orientation, may be used for introducing media 820. These implementations are merely exemplary, and other implementations may also be used.

FIG. 8B is a cut-away view of introducing media into a mandrel consistent with an embodiment of the present invention, as shown in FIG. 8A. As shown in FIG. 8B, in one implementation, media 820 is introduced into media cavity 660, which is located in cavity 665. As described above, if a vacuum has been applied to form tool 710, when media 820 is added, media cavity 660 is vented to the atmosphere. Alternatively, as described above, if pressure is applied to the interior of bag 620, media cavity 660 is filled with media 820 while pressurized. This implementation is merely exemplary, and other materials and implementations may also be used.

With reference to FIG. 8B, in one implementation, during the introduction of media 820, media 820 may be compacted to settle the media and to make mandrel 600 more rigid. The amount of compaction may depend on the particulate size of media 820. For example, if media 820 can be broken into smaller pieces during the filling process, space located in clumps of media 820 may be removed, which would allow for greater compaction. Also, as described in FIGS. 8C-8E (below), conductors 670 and conductors 680 may be used to achieve compaction. This implementation is merely exemplary, and other materials and implementations may also be used.

FIG. 8C is an illustrative view of a conductor assembly consistent with an embodiment of the present invention, as shown in FIG. 8B. As shown in FIG. 8C, in one implementation, conductor assembly 850 comprises two first conductors 880, two second conductors 890, and two controllers 860, 870. The number of these conductors and controllers are depicted for ease of illustration and any appropriate number of conductors or controllers may be used. In this implementation, conductors 880 and conductors 890 are similar to conductors 670 and conductors 680 described in FIG. 8B. In this implementation, conductors 880 are connected to controller 860, and conductors 890 are connected to controller 870. Again, in other implementations, any appropriate number of conductors and any appropriate number of controllers may be used.

As shown in FIG. 8C, in one implementation, controllers 860, 870 comprise a power supply 862, 872, a bank of energy storing capacitors 864, 874, and a high voltage switch 866, 876, respectively. Capacitors 864, 874 are connected to power supplies 862, 872, respectively. Switches 866, 876 are connected to capacitors 864, 874 and to conductors 880, 870, respectively. On demand, power supplies 862, 872 provide a charge to capacitors 864, 874. When capacitors 864, 874 are fully charged, high voltage switches 866, 876 may be activated. On activation, switches 866, 876 release the charge from capacitors 864, 874 into conductors 880, 890. This creates a current flow in conductors 880, 890, which in turn produces a magnetic field around conductors 880, 890. The magnetic field around conductors 880, 890 results in a mechanical displacement, which is used for various purposes, as described below. This implementation is merely exemplary, and other implementations may also be used.

With regard to the displacement, as shown in FIG. 8C, in this implementation, controller 860 creates a current flow in conductors 880 in one direction, while controller 870 creates a current flow in conductors 890 in an opposite direction. As shown in FIG. 8C, the resulting magnetic fields around conductors 880 and conductors 890 result in a repulsive force, which forces conductors 880 and conductors 890 apart. This repulsive force results in a vibration of conductors 880 and 890. When these conductors are placed in a mandrel, such as mandrel 600, this will cause a "vibration" over a large portion of the interior of the mandrel. This implementation is merely exemplary, and other materials and implementations may also be used.

FIG. 8D is a cut-away view of a portion of a mandrel depicting compacting of media consistent with an embodiment of the present invention, as shown in FIG. 8C. As shown in FIG. 8D, in this implementation, conductors 670 and conductors 680 have been charged such that the current flow in conductors 670 is opposite to the current flow in conductors 680. As described in FIG. 8C, this generates a repulsive force causing second conductor layer 650 to separate from first conductor layer 630, which increases the size of spacing layer 640. The repulsive force and the increase in size of spacing layer 640 also impart a force on cavity 665. This also results in a force on media 820 in media cavity 660. This results in the vibration of media cavity 660.

For example, when mandrel 600 is being filled with media 820 as described in FIG. 8A, conductors 670 and 680 may be intermittently charged to reduce the filling time. By dislodging media 820, air pockets are removed, which allows more media 820 to enter the mandrel, which increases the compaction of media 820. In other implementations (as described below), this force may also be used to dislodge media 820.

For example, in FIG. 8D, media 820 is shown in media cavity 660, where media cavity 660 is only partially filled. In FIG. 8D, media 820 has been dislodged, so that media cavity 660 may be entirely filled, as shown in FIG. 8E (below). This implementation is merely exemplary, and other materials and implementations may also be used.

With reference to FIG. 8D; in one implementation, conductors 670, 680 are pulsed at timed intervals to reduce the filling time and to increase compaction. When this pulse occurs, media 820 is vibrated in bag 610. After the pulse, the elasticity of bag 610 material restores bag 610 to its original form. The optimum frequency of these pulses will depend on media 820 and the size and shape of bag 610. This implementation is merely exemplary, and other implementations may also be used.

FIG. 8E is a cut-away view of a mandrel filled with media consistent with an embodiment of the present invention, as shown in FIG. 8D. As shown in FIG. 8E, after media 820 is introduced into media cavity 660 in bag 610 in mandrel 600, conductors 670 and 680 may be used to aid compaction until media cavity 660 is filled or substantially filled with media 820. As shown in FIG. 8E, in contrast to FIG. 8D, first conductor layer 630, spacing layer 640, and second conductor layer 650 have returned to their original positions following compaction. As described above, conductors 670, 680 may be charged to provide for the compaction of media 820 in media cavity 660. This implementation is merely exemplary, and other implementations may also be used.

Figure 9:
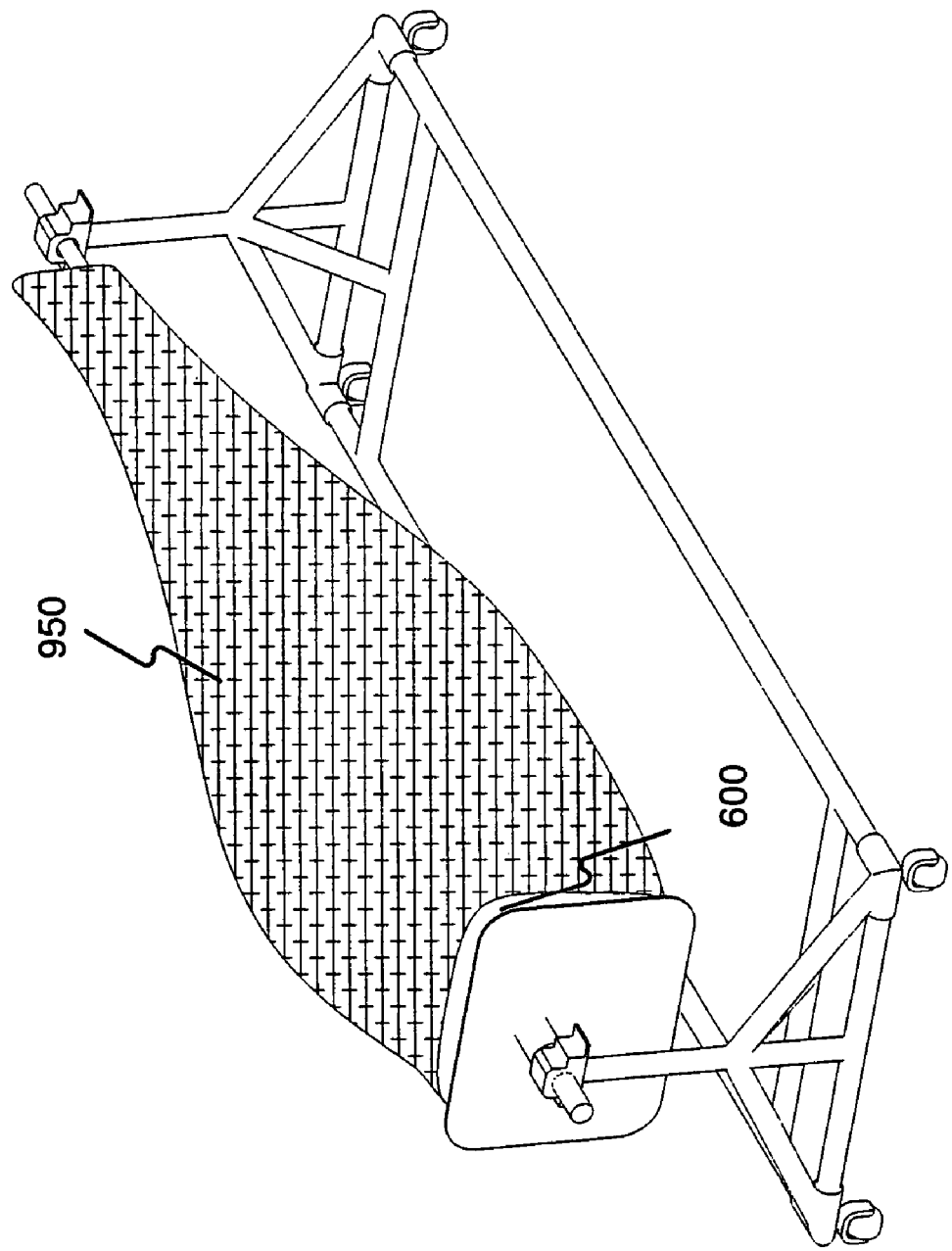
FIG. 9 is a perspective view of a mandrel form created on a mandrel consistent with an embodiment of the invention, as shown in FIGS. 8A-8E.

FIG. 9 is a perspective view of a mandrel form created on a mandrel consistent with an embodiment of the invention, as shown in FIGS. 8A-8E. As shown in FIG. 9, composite part 950 has been formed around mandrel 600. Prior to formation of composite part 950, form tool 710 is removed. After removal of form tool 710, mandrel 600 will retain its desired shape due to media 820 contained in bag 610, which is held under vacuum. Composite part 950 may then be created around mandrel 600.

Any appropriate number of methods or systems may be used to create composite part 950, which includes, for example, a fuselage. In one implementation, composite filament is wound around mandrel 600 to create composite part 950. This implementation is merely exemplary, and other implementations may also be used.

Figure 10A:
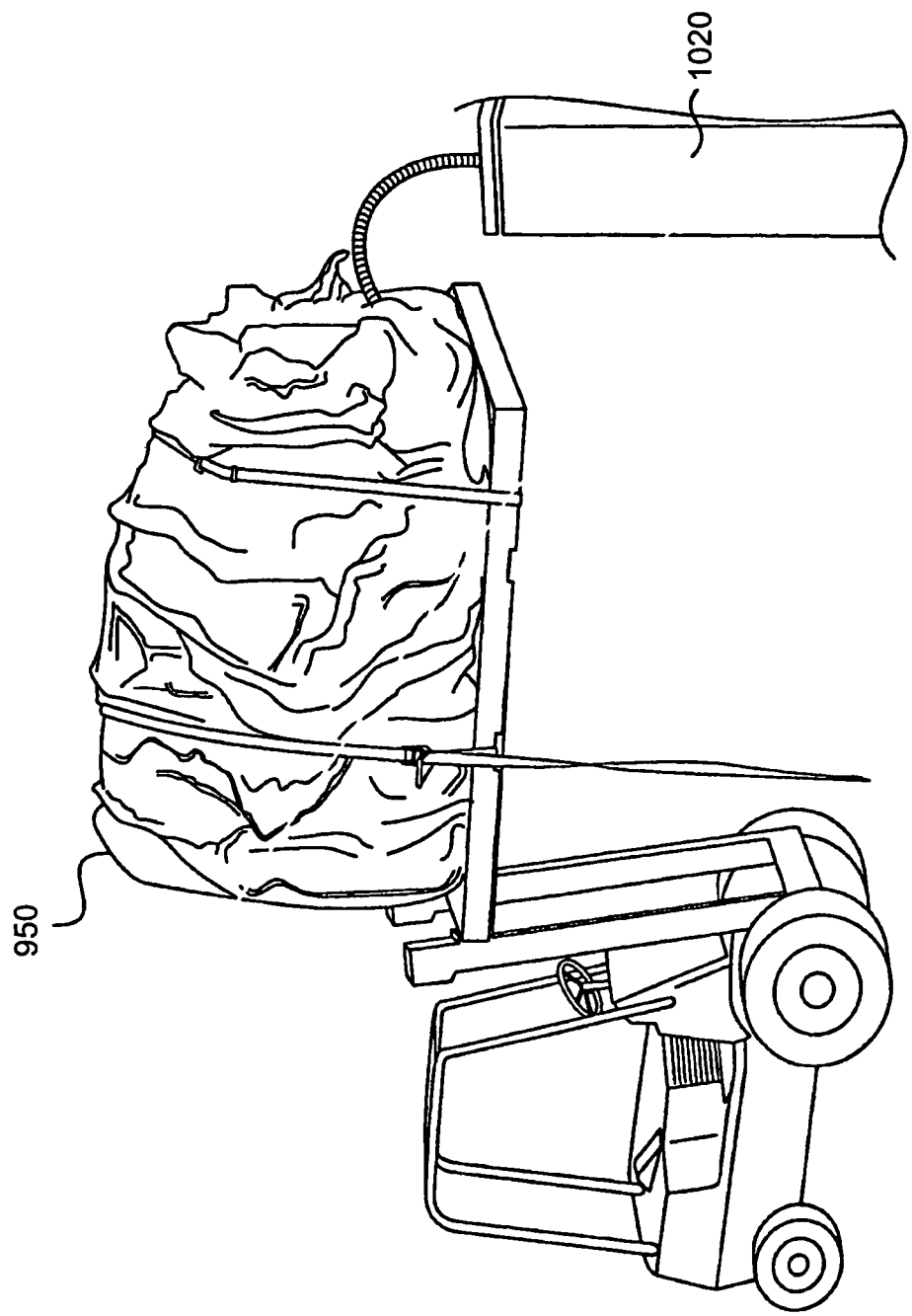
FIG. 10A illustrates removing media from a mandrel form consistent with an embodiment of the present invention, as shown in FIG. 9.

FIG. 10A illustrates removing media from a mandrel form consistent with an embodiment of the present invention, as shown in FIG. 9. As shown in FIG. 10A, following the formation of composite part 950, media 820 (not shown) is removed from composite part 950. In one implementation, a vacuum 1020 removes media 820 through fill ports (not shown) in armature 620 (also not shown) in composite part 950. In some cases, however, vacuum 1020 cannot remove all of media 820, because media 820 has become compacted. This implementation is merely exemplary, and other implementations may also be used.

FIG. 10B is a cut-away view of compacted media removal in a mandrel consistent with an embodiment of the present invention, as shown in FIG. 10A. As shown in FIG. 10B, in one implementation, the components of FIG. 10B are the same as FIG. 8B, except that composite part 950 is atop mandrel 600. Compacted media 1030 remains in bag 610 because all of compacted media 1030 was not extracted. As shown in FIG. 10B, for example, about half of compacted media 1030 remains in bag 610. Of course, any amount of compacted media 1030 could be remaining in bag 610 after an attempt to remove compacted media 1030. This implementation is merely exemplary, and other implementations may also be used.

FIG. 10C is a cut-away view of a portion of a mandrel depicting extraction of media consistent with an embodiment of the present invention, as shown in FIG. 10B. As shown in FIG. 10C, in one implementation, the same stages are followed as described in FIG. 8D for media compaction to obtain media extraction. Thus, in this implementation, conductors 680 and 670 are charged and the repulsive force causes second conductor layer 650 to separate from first conductor layer 630, which increases the size of spacing layer 640. The repulsive force and the increased size of spacing layer 640 also generate an impact force on media cavity 660, which creates a vibration. This vibration dislodges media 1030 into smaller parts. These smaller parts may then be more easily removed by vacuum 1020 (not shown). One distinction between media compaction in FIG. 8D and media extraction in FIG. 10C is that, during media compaction, a vacuum or pressure may be used to force media into bag 610, whereas during media extraction, a vacuum may be used to remove media from bag 610. This implementation is merely exemplary, and other implementations may also be used.

Figure 11:
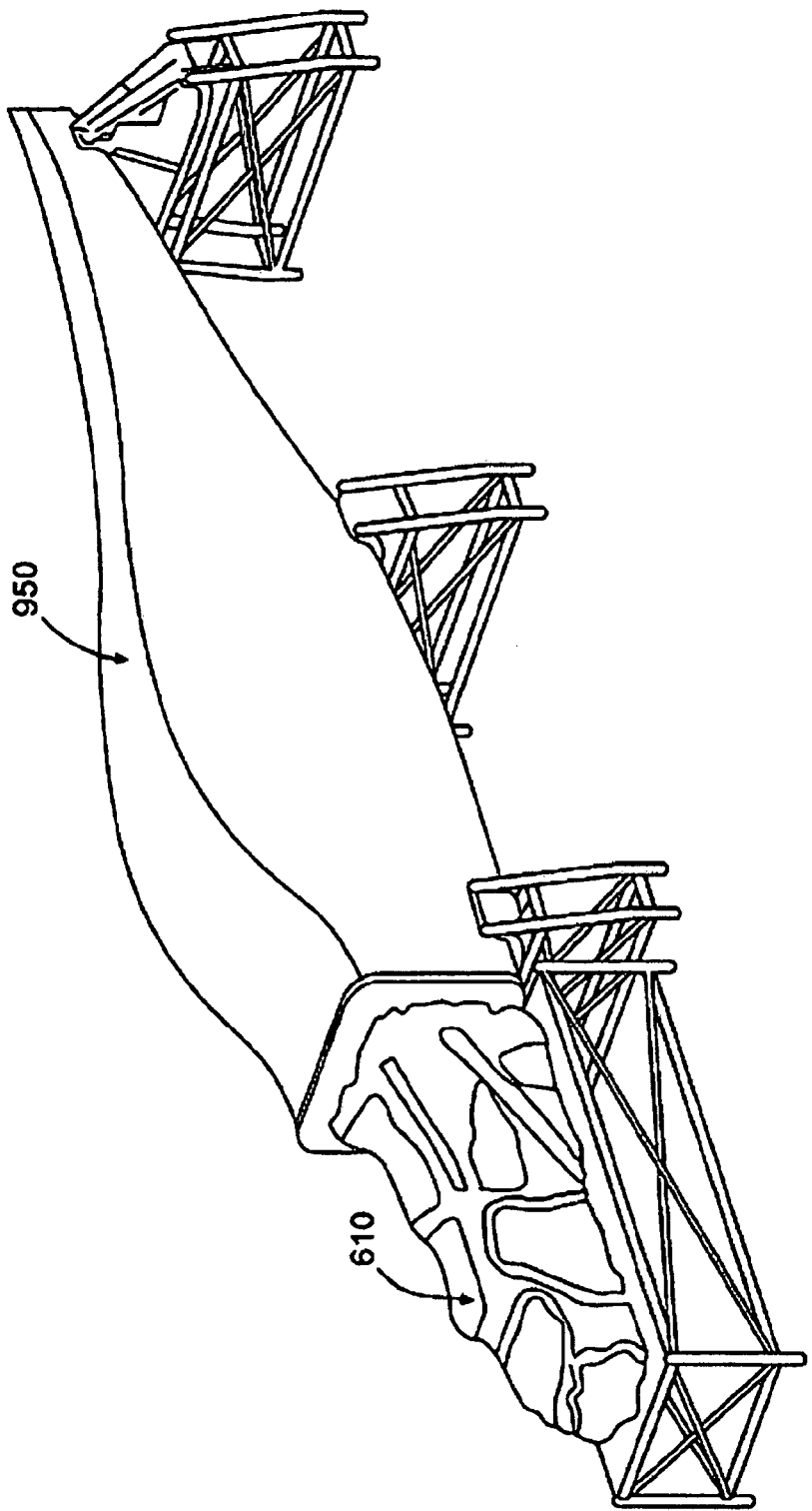
FIG. 11 illustrates removing a mandrel from, a mandrel form consistent with an embodiment of the present invention, as shown in FIGS. 10A-10C.

FIG. 11 illustrates removing a mandrel from a mandrel form consistent with an embodiment of the present invention, as shown in FIGS. 10A-10C. As shown in FIG. 11, following removal of the media (as shown above) and after the removal of armature 620 from composite part 950 (not shown), bag 610 is also removed from composite part 950. In one implementation, conductors 680 and 670 (not shown) may be once again energized to facilitate separation of bag 610 from fuselage 950. In another implementation, another set of conductors may be positioned in an elastomeric subassembly that would be fitted around fuselage 950. In this implementation, instead of acting from the interior of the assembly, this implementation would act on the exterior of composite part 950 to aid in extraction of bag 610. Still other implementations may also be used. These implementations are merely exemplary, and other implementations may also be used.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. A method of extracting media from an elastomeric tooling with media, the media being added to provide rigidity during processing, comprising;
   inserting a vacuum into the tooling;
   removing media from the tooling using the vacuum; and
   vibrating the tooling during removing media to dislodge the media in the tooling,
   wherein vibrating further comprises:
      generating a first current flow in a first conductor located in the tooling thereby creating a first magnetic field around the first conductor; and
      breaking at least one clump of solid media in the tooling into smaller pieces of solid media to aid dislodgment of the media by producing a vibration in the tooling by generating a second current flow opposite the first current flow in a second conductor located in the tooling and being in proximity to the first conductor thereby creating a second magnetic field around the second conductor;
      wherein the first and second magnetic fields force the first and second conductors apart thereby producing the vibration in the tooling.

2. The method of claim 1, wherein vibrating the tooling occurs at timed intervals during removing media from the tooling.

3. The method of claim 1, wherein
   generating a current flow in a first conductor further comprises:
      providing a charge to a first plurality of capacitors from a first power source; and
      releasing the charge from the first plurality of capacitors into the first conductor; and
   generating a current flow in a second conductor further comprises:
      providing a charge to a second plurality of capacitors from a second power source; and
      releasing the charge from the second plurality of capacitors into the second conductor.

* * * * *